United States Patent [19]

Agius

[11] 4,411,567
[45] Oct. 25, 1983

[54] TUBULAR KEY CUTTING MACHINE

[76] Inventor: Frank P. Agius, 909 Washington Ave., Alpena, Mich. 49707

[21] Appl. No.: 301,580

[22] Filed: Sep. 14, 1981

[51] Int. Cl.³ .............................................. B23C 1/16
[52] U.S. Cl. ...................................... 409/82; 76/110
[58] Field of Search .................. 409/81, 82, 83, 229; 76/110

[56] References Cited

U.S. PATENT DOCUMENTS

| | | | |
|---|---|---|---|
| 1,978,009 | 10/1934 | Caron | 409/82 |
| 2,129,087 | 9/1938 | George et al. | 409/82 |
| 3,418,882 | 12/1968 | Brand | 409/82 |
| 3,818,798 | 6/1974 | Kotov | 409/82 |
| 4,022,107 | 5/1977 | Palk | 409/82 |
| 4,324,513 | 4/1982 | Hughes | 409/82 |
| 4,325,662 | 4/1982 | Evans | 409/82 |

*Primary Examiner*—William R. Briggs
*Attorney, Agent, or Firm*—Harpman & Harpman

[57] ABSTRACT

A tubular key blank is received in a rotatable, indexable chuck. The chuck is positioned below a selectively actuatable milling tool that is movable vertically and horizontally to mill grooves at designated positions in the key blank.

11 Claims, 7 Drawing Figures

FIG. 1

TUBULAR KEY CUTTING MACHINE

BACKGROUND OF THE INVENTION (1) Technical Field:

This invention relates to key cutting machines and more particularly concerns a tubular key cutting machine wherein a key bite is milled into a key blank in a direction oriented radially to the key blank tube.

(2) Description of the Prior Art:

Tubular keys for operation of axial pin tumbler locks such as the type generally described in U.S. Pat. No. 3,504,748 are in general use and machines for cutting or machining such tubular keys have been heretofore proposed and are subject of several U.S. Pat. Nos. including 3,418,882; 3,818,798 and 4,022,107.

In each of these disclosures the tubular key blanks are mounted adjustably relative to a rotatable milling tool and the patents include indexing means by which the relative positioning of the tubular key blanks and the milling tool can be predetermined and repeatedly reset. In actual practice the indexing means disclosed in the prior art patents is not sufficiently accurate to consistently reproduce usable tubular keys. The lack of accuracy in the prior art devices is occasioned primarily by the plurality of parts that are movably interposed between the actual indexing means and the actual milling or cutting device and/or the tubular key blank.

SUMMARY OF THE INVENTION

In the present invention the tubular key blank is positioned in a collet that will accept and hold tubular key blanks of various diameters, the collet being mounted on a turntable which is carried by the key cutting machine, the collet and tubular key blank mounted therein being movable with the turntable to a position beneath a cutting tool which is positioned in spaced relation above the turntable. The cutting tool is provided with means for rotating it and it is movable vertically as well as horizontally and provided with limiting devices to insure the accuracy of the travel of the cutting tool. The tubular key cutting machine as disclosed will cut grooves completely around the periphery of various diameter keys and it will cut such grooves to any depth required and it will also cut away portions of the tubular key blank such as master cuts in any position and any depth required. The selection of the areas of the tubular key blank to be grooved or cut are determined by rotation of the collet and the key blank therein and the relatively few parts position the tubular key blank and the cutting tool in controlled accurate desirable relation.

DESCRIPTION OF THE DRAWINGS

FIG. 1 is a side elevation of the tubular key cutting machine with parts broken away and parts in cross section;

DESCRIPTION OF THE PREFERRED EMBODIMENT

Figure 1:
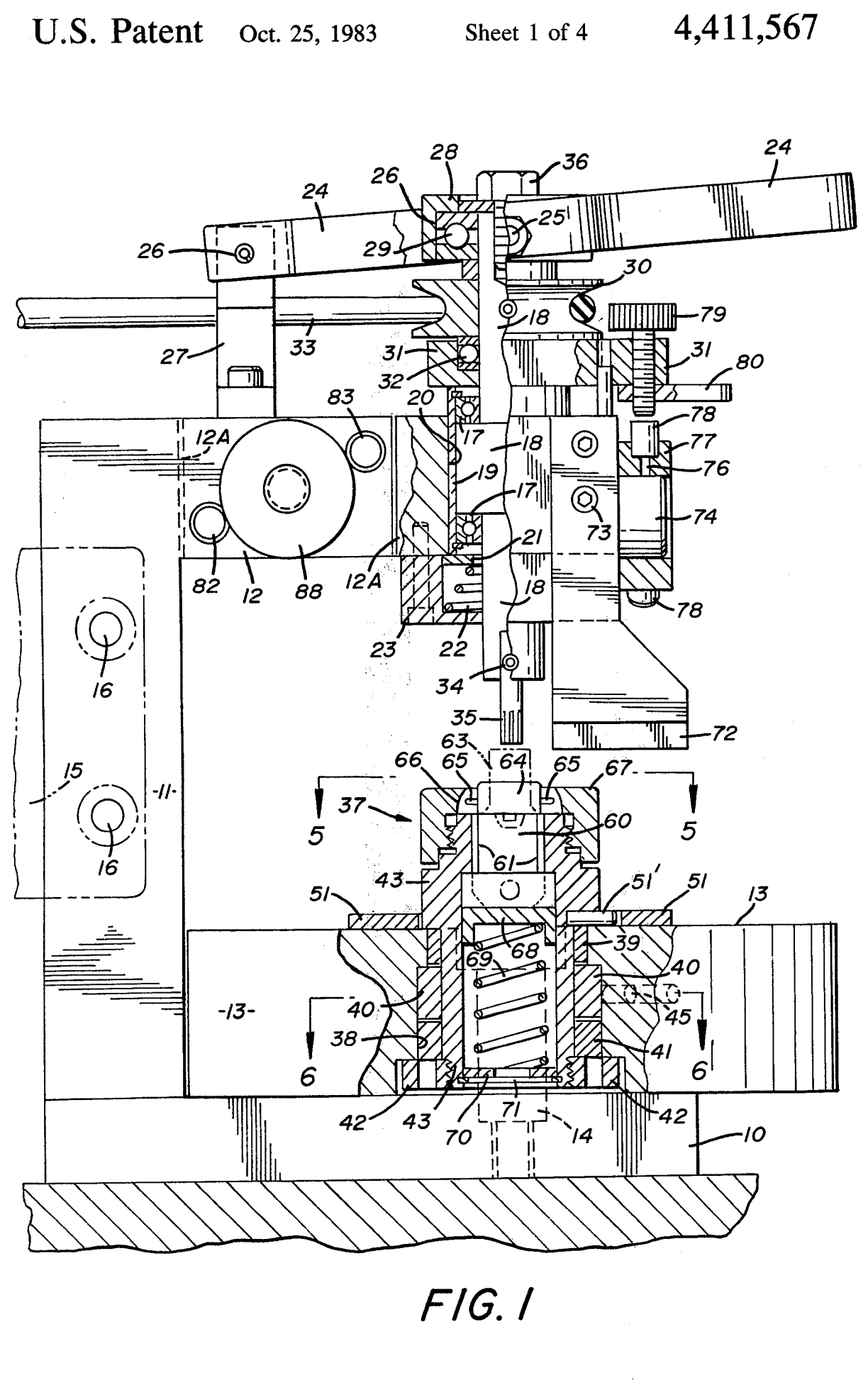
Figure 2:
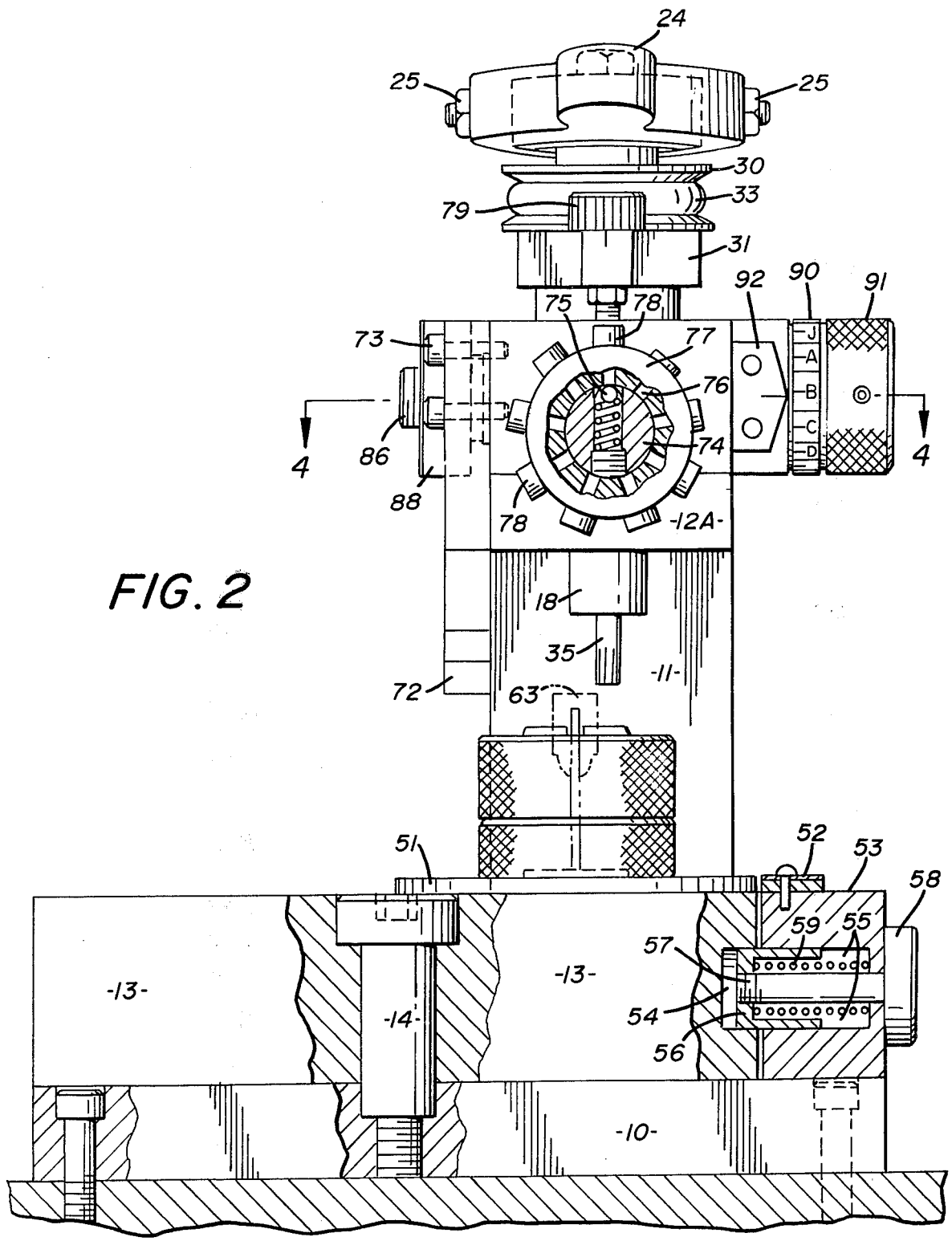
FIG. 2 is a front elevation of the key cutting machine with parts broken away and parts in cross section.
Figure 3:
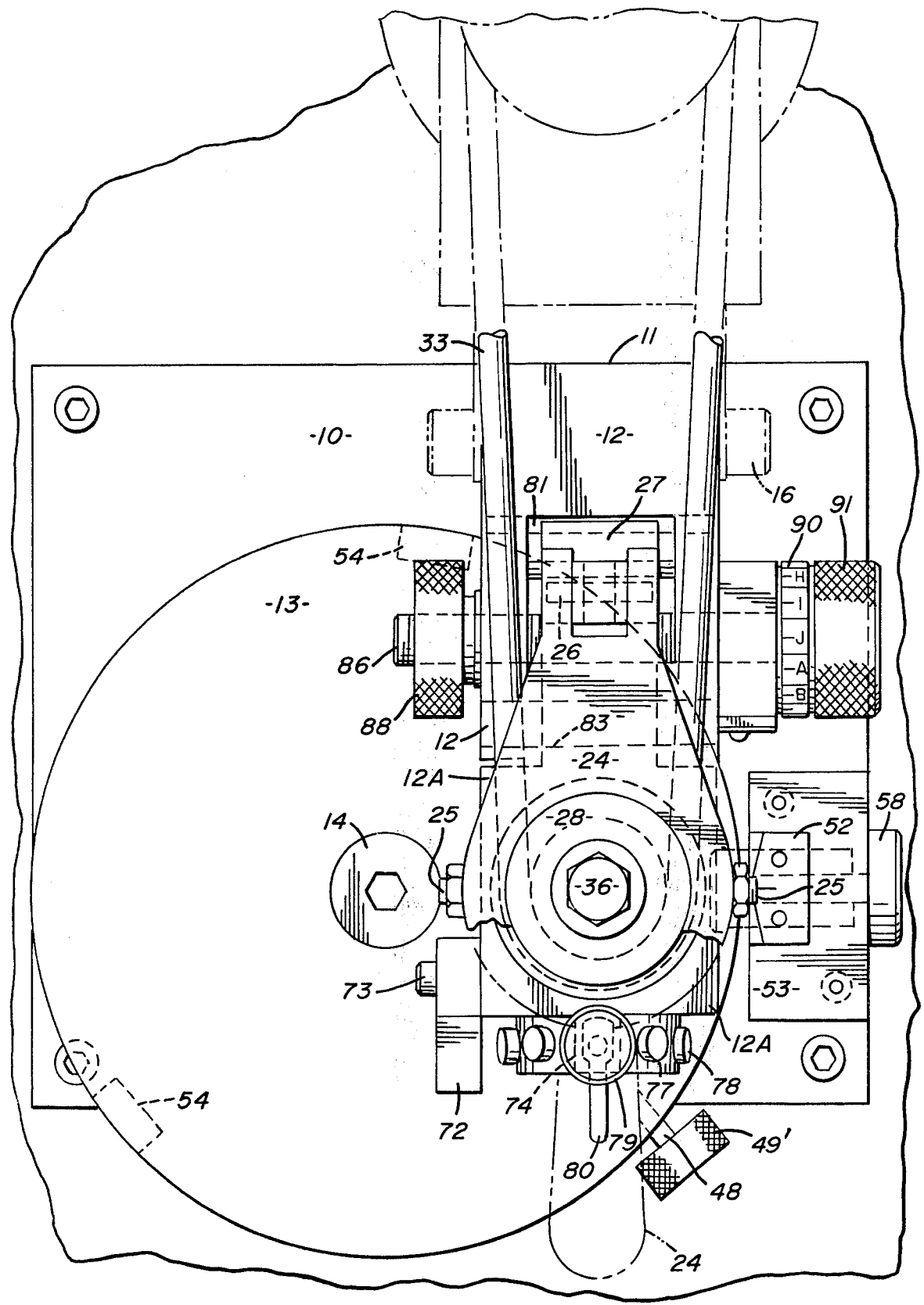
FIG. 3 is a top plan view of the key cutting machine seen in FIGS. 1 and 2.

By referring to the drawings and FIGS. 1, 2 and 3 in particular, it will be seen that a key cutting machine has been disclosed which comprises a base 10 having an inverted L-shaped frame secured thereto at one side thereof. The inverted L-shaped frame includes a vertical section 11 and a horizontal section 12.

The base 10 rotatably supports a turntable 13 journaled on a vertical member 14 as best seen in FIGS. 2 and 3 of the drawings. A bracket 15 is attached to the vertical section 11 of the inverted L-shaped frame by fasteners 16 and extends outwardly therefrom and supports a source of rotary motion such as an electric motor, not shown. The horizontal section 12 of the inverted L-shaped frame is positioned off center with respect to the vertical member 14 on which the turntable 13 is rotatably mounted, as best seen in FIGS. 2 and 3 of the drawings.

Bearings 17 rotatably position a vertically disposed spindle 18 in a sleeve 19 which is movable vertically in a bore 20 in a movable horizontal section 12A of the inverted L-shaped frame of the machine.

An apertured disc 21 is positioned beneath the lower end of the sleeve 19 and is urged thereagainst by a spring 22 which in turn is positioned in a housing 23 secured to the lower surface of the movable horizontal section 12A. The arrangement is such that the spindle 18 may be moved vertically in one direction by the spring 22 and in the opposite direction by a handle 24 which is pivoted by pivots 25 & 26 to a bracket 27 and to a secondary housing 28 in which a secondary bearing 29 is disposed about the upper end of the spindle 18. A pulley 30 is secured to the spindle 18 immediately above a third housing 31 which mounts a third bearing assembly 32 which is engaged on the upper end of the sleeve 19 and positions both the spindle 18 and the pulley 30 so that relatively free motion of the spindle 18 is possible. A drive belt 33 is trained over the pulley 30 and extends to the electric motor heretofore referred to (not shown) so that the spindle 18 can be rotated thereby. The lower end of the spindle 18 has mounting means 34 therein by which a cutting tool 35 is attached thereto. The upper end of the spindle 18 is held in the secondary housing 28 by a bolt 36.

It will thus be seen that vertical movement imparted the spindle 18 and the cutting tool 35 by the handle 24 will move the cutting tool 35 toward and away from the turntable 13 with downward movement of the handle 24 being opposed by the coil spring 22 which tends to urge the spindle 18 upwardly. The cutting tool 35 is also movable horizontally.

Figure 6:
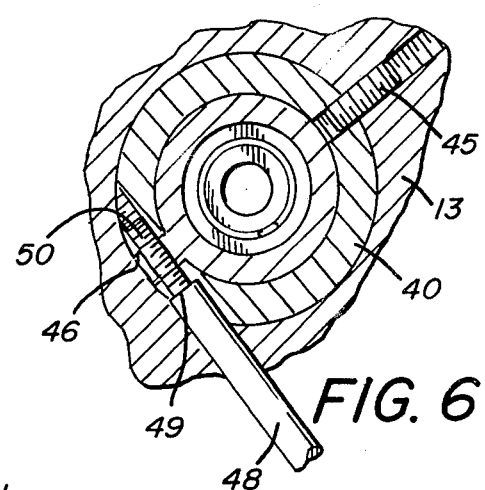
FIG. 6 is a horizontal section on line 6-6 of FIG. 1.
Figure 7:
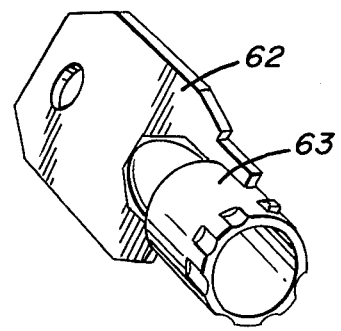
FIG. 7 is a perspective elevation of a tubular key as formed by the key cutting machine.

In order that a tubular key blank can be properly positioned for the formation of a tubular key such as seen in FIG. 7 of the drawings, a collet 37 is mounted in a bore 38 in the turntable 13 offcenter with respect to the vertical member 14 on which the turntable 13 is rotatabl- mounted on the base 10 and the collet is so devised that tubular key blanks of various diameters can be mounted therein and held thereby. The bore 38 is of larger diameter than the portion of the collet 37 which is received thereby and positions three mounting rings 39, 40 and 41 respectively therein, the rings being held in the bore 38 in the turntable by a threaded ring 42 which is engaged in a cylindrical body 43 of the collet 37 which is positioned within the area defined by the rings 39, 40 and 41. The rings 39 and 41 are annular and continuous and the ring 40 is split vertically at one side thereof and a portion of the same cut away as best seen in FIG. 6 of the drawings.

By referring to FIG. 1 and FIG. 6, which is a cross section on line 6—6 of FIG. 1, it will be seen that a set screw 44 in a threaded bore 45 in the turntable 13 locks the split ring 40 in position in the bore 38 at a point opposite the split therein.

Still referring to FIG. 6 of the drawings, it will be seen that a threaded opening 46 is formed inwardly of one of the split ends of the split ring 40 and a bore 47 of different diameters is formed in the other end of the split ring 40 so that it extends axially with respect to the threaded opening 46. A rod 48 having a shoulder 49 inwardly of its end has an extension 50 of reduced diameter relative to the shoulder 49, the extension being threaded and engaged in the threaded opening 46. The other end of the rod 48 extends outwardly of the turntable 13 and has a knurled knob 49' thereon so it may be revolved thereby. The cylindrical portion 43 of the collet 37 is thereby rotatably positioned in the bore 38 and actually engaged by the rings 39, 40 and 41 so that it can be rotated when the split ring 40 is loosened by counterclockwise motion imparted the rod 48 by the knurled knob 49 thereon and alternately secured in desired position by rotating the rod 48 clockwise as will occur to those skilled in the art.

Figure 5:
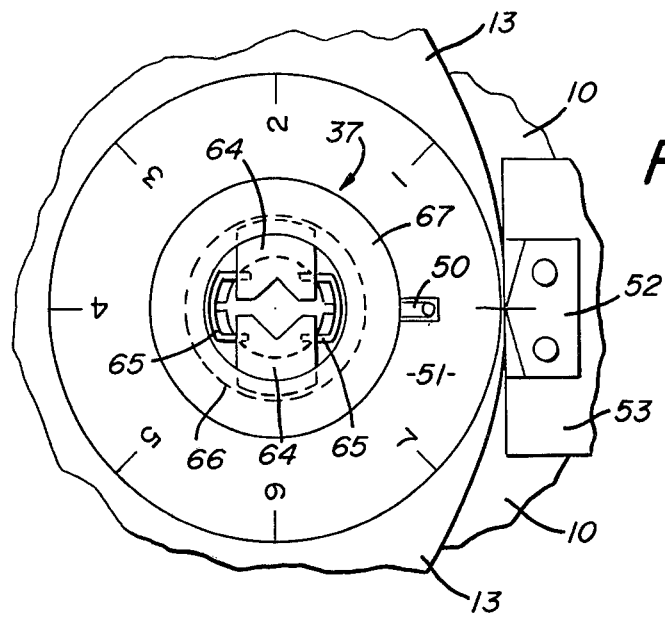
FIG. 5 is a horizontal view of a portion of the key cutting machine and taken on line 5-5 of FIG. 1.

A pin 51' is positioned in one side of the cylindrical portion 43 of the collet 37 and extends outwardly therefrom and registers in a slot in an apertured spacing plate 51 which surrounds the collet 37 and rests on the upper surface of the turntable 13 as best seen in FIGS. 1 and 5 of the drawings. Indicia is carried on the upper surface of the plate 51 and a marker 52 is affixed to the upper surface of a block 53 which is attached to the base 10 at one side of the turntable 13 as best seen in FIGS. 2, 3 and 5 of the drawings, the block 53 being of the same height as the turntable 13. In order that the turntable 13 may be indexed into predetermined locations relative to the base 10 and the rest of the tubular key cutting machine, a plurality of circumferentially spaced openings 54 are formed in the periphery thereof in even circumferentially spaced relation to one another. One of these is seen in FIG. 2 of the drawings and the block 53 is arranged with a bore 55 in which a slidable body member 56 is disposed, the body member 56 being threadably engaged on the end of a shaft 57 which in turn has a knurled knob on its outermost end by which it may be moved longitudinally. The body member 56 is urged inwardly of the bore 55 by a spring 59.

By referring now to FIGS. 1 and 5 of the drawings, the collet 37 will be seen to include the cylindrical portion 43 heretofore referred to, the upper inner portion of which is threaded to receive a sleeve 60 which has oppositely disposed longitudinally extending grooves 61 therein. The grooves 61 are slightly wider than the width of the flat handle portion 62 of the tubular key as seen in FIG. 7 of the drawings, the tubular body thereof being indicated by the numeral 63.

In FIG. 1 of the drawings, broken lines show the positioning of an inverted tubular key with the handle portion 62 engaged in the opposite disposed grooves 61 and the tubular body 63 extending above a pair of jaws 64 which are slidably disposed on the upper end of the bore 60 and held in movable relation to one another by a pair of oppositely disposed generally U-shaped springs 65 as best seen in FIG. 5 of the drawings. The inner adjacent ends of the jaws 64 are shaped with oppositely disposed 45° V-configurations and the outer opposite ends of the jaws 64 are beveled so as to partially underlie an inwardly curving surface 66 of a rotatable collet body 67 which is threadably engaged on the upper outer surface of the cylindrical portion 43 of the collet. Jaws 64 are keyed to the portion 43.

In FIG. 1 of the drawings, the cylindrical portion 43 of the collet 37 will be seen to enclose a cap 68 immediately beneath the bore 60 so that the end of the handle portion of a tubular key positioned in the grooves 61 in the bore 60 as heretofore referred to will rest on the cap 68. The cap 68 is urged upwardly by a spring 69 in the cylindrical portion 43 of the collet 37 on a ring 70.

It will thus be seen that the collet 37 being positioned off center on the turntable 13 of the tubular key cutting machine can be rotated when desired to a position where a tubular key blank can be easily positioned therein and moved downwardly relative thereto and secured in a lowered position by tightening the rotatable collet body 67 whereupon the turntable 13 may be rotated to a position immediately to one side of the cutter 35 and beneath a guide shoe 72 which is attached by fasteners 73 to one side of the horizontal section 12 as seen in FIGS. 1 and 3 of the drawings.

In such position, the rotatable collet body 67 is rotated slightly to relieve pressure on the jaws 64 holding the tubular key blank whereupon the spring 69 will move the same upwardly and into engagement with the guide shoe 72 thus establishing a desired predetermined relation of the tubular body 63 of the tubular key blank with respect to the cutter 35 whereupon the rotatable collet body 67 is tightened and the tubular key blank secured. The turntable 13 is then rotated to bring the tubular key blank into desired position below the cutter 35 so that downward movement of the cutter 35 will cut the desired grooves around the periphery of the tubular body 63 in any position and in any depth required.

It will be observed that the proper elevation of the tubular body of the key blank is very important in the formation of a properly grooved tubular key and that the location of the grooves in the periphery of the tubular body of the tubular key blank are equally critical. In order to insure the proper location of the grooves to be formed in the tubular body of the tubular key blank, the spacing plate 51 is placed on the turntable 13 around the collet 37 and aligned by placing a slot therein over the pin 50. The spacing plate 51 will thus move with the collet and when set at the indicia marks on the plate 51, the tubular key blank will rotate due to the desired circumferentially spaced location for the formation of the grooves in the periphery thereof.

Thus the tubular key blank is held in desired position in the collet 37 and the collet 37 after being rotated to the desired position as indicated by the indicia on the spacing plate 51 is locked in position in the turntable by the actuation of the means clamping the split band 40 to the cylindrical portion 43 of the collet.

The movement of the cutter 35 is also precisely controlled so that the depth of the groove formed in the tubular body 63 of the tubular key blank will be the exact depth desired. In order to control this setting of the tubular key cutting machine, the horizontal section 12 of the machine has a projecting hub 74 as seen in FIGS. 1, 2 and 3 of the drawings, the hub 74 having a spring urged detent 75 therein which is arranged for registry with one of a plurality of circumferentially positioned apertures 76 in a depth cam 77, the periphery of which includes a plurality of cam extensions 78 arranged in circumferentially spaced relation and matching the pattern of the circumferentially spaced apertures 76. Each of the cam extensions 78 is of a different height. An adjustment screw 79 is threadably positioned in a threaded bore in a portion of the housing 31 which contains the bearing 32 and is positioned immediately adjacent the pulley 30 on the spindle 13. A lock nut and lever device 80 secures the adjustment screw 79 in adjusted position relative to the spindle 18 and the adjustment screw 79 is positioned so that its lower end will engage one of the cam extensions 78 and thus determine the depth to which the cutter 35 may move with respect to the tubular body 63 of the tubular key blank.

Figure 4:
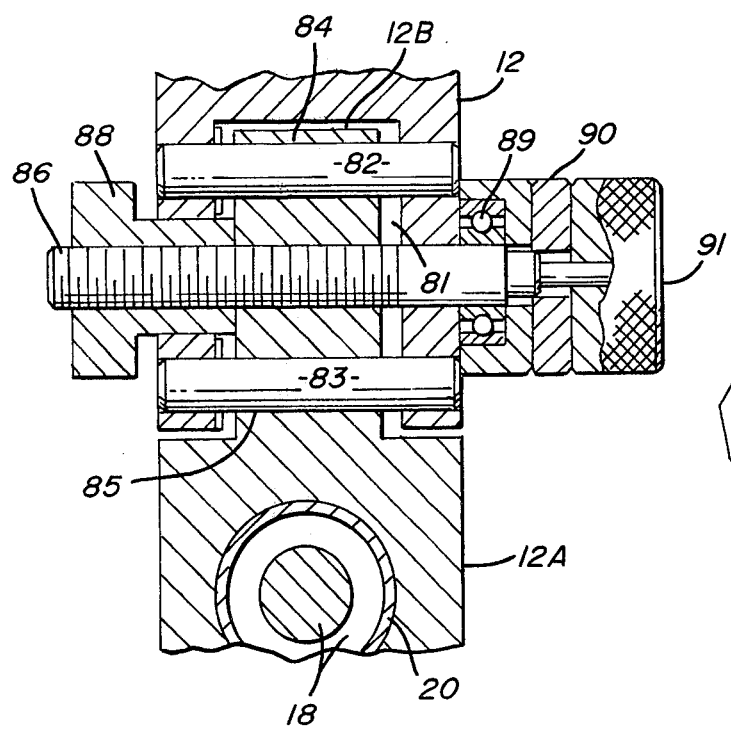
FIG. 4 is a horizontal section on line 4-4 of FIG. 2.

The position of the cutter 35 is also variable transversely of the tubular key cutting machine relative to the tubular key blank so that the width of the grooves to be formed therein can be accurately and desirably controlled. The adjustment means is best illustrated in FIGS. 2, 3 and 4 of the drawings, and by referring to FIG. 4 in particular, it will be seen that the outermost portion of the horizontal section 12 is actually movable transversely with respect to the remainder thereof and the vertical section 11. In FIG. 4 of the drawings, the fixed portion of the horizontal section 12 will be seen to have a cut away area 81 therein with a pair of shafts 82 and 83 respectively, positioned thereacross. The outermost portion of the horizontal section 12 is illustrated in FIG. 4 of the drawings and indicated by the reference numeral 12A and it has a section 12B of narrower width than the remainder which is provided with transverse bores 84 and 85 in which the transverse shafts 82 and 83 are respectively positioned. The outermost portion 12A of the transverse section 12 is thereby capable of transverse movement and in order that this movement can be controlled a shaft 86 is threadably engaged in a threaded bore 87 in the narrower section 12B and extends outwardly in one direction, to the left in FIG. 4, and receives a lock nut 88, the inner portion of which is engaged against the side of the narrower section 12B as illustrated. The right end of the threaded shaft 86 is unthreaded and extends through a bearing 89 and indicia collar 90 and is engaged in an adjustment knob 91. In order to move the portion 12A of the horizontal section 12 transversely to control the width of the groove being formed by the cutter 35 in the tubular body of the tubular key blank, the lock nut 88 is loosened and the adjustment knob 91 rotated thus revolving the shaft 86 and causing relative movement of the outward section 21A of the horizontal section 12. When the desired setting has been obtained, the nut 88 is tightened. The collar 90 rotates around a hub portion of the adjustment knob 91 so that adjustment can be made to realign the collar according to a pointer 92 as best seen in FIG. 2 of the drawings.

In operation, a tubular key blank is positioned in the collet 37 and depressed as heretofore described. The collet is then tightened, the spacing plate 51 is positioned over the collet and the turntable 13 rotated to bring the tubular key blank beneath the spacing shoe 72 whereupon the collet is loosened to permit the tubular key blank to move into position thereagainst, the collet tightened, and the turntable rotated to bring the tubular key blank into cutting position and the turntable locked in position by the member 56 engaging an appropriate opening 54 therein. A depth cam 77 is then positioned on the hub 74 of the transversely movable outward portion 12A of the horizontal section 12 of the machine and rotated to the desired depth of the first cut. The exceedingly fine transverse adjustment of the outward portion 12A, the spindle 18 therein and the cutter 35 is then made with reference to the width of the groove to be cut in the first position as determined by the indicia on the collar 90 and the pointer 92, as heretofore described, whereupon the cutter 35 is rotated, the handle 24 depressed and the cutter 25 will move downwardly in the exact desired relation to the tubular body 63 of the tubular key blank to form the first groove in the periphery thereof to the exact desired depth and the exact desired width.

To form the second groove, the collet 37 is loosened and revolved with the spacing plate 51 to the second indicia position thereof relative to the pointer 52, the depth cam 77 reset if necessary, and the width setting adjusted by means of the knob 91 as indicated by the relative positions of the collar 90 and the indicia thereon with the pointer 92 whereupon the cutter can be again depressed and the second groove formed to the exact desired depth and width. The operation is repeated until the desired number of grooves are formed in the peripheral surface of the tubular body 63 of the tubular key blank. When completed, the member 56 is moved from the opening 54, the turntable 13 revolved, the collet 37 loosened, and the completed tubular key removed from the machine.

Those skilled in the art will observe that the precise adjustment of the tubular key blank relative to its positioning in the collet and more importantly the precise positioning of the cutter 35 relative thereto enables the machine to repeatedly repeat the accurate formation of tubular keys from a predetermined code by simply adjusting the machine and operating the cutter as hereinbefore described.

Having thus described my invention what I claim is:

1. A tubular key cutting machine comprising in combination a horizontal turntable, a rotatable chuck positioned off center in said turntable, means in said rotatable chuck for mounting a tubular key blank in any of a plurality of vertically spaced locations, key cutter means arranged for dual movement along a path parallel with the axis of said tubular key blank in said rotatable chuck and transversely of said path for selective engagement with said tubular key blank when said turntable is in a first position, first adjustment means for locating said cutter means in any of a plurality of transversely disposed locations relative to said path, second adjustment means for locating said cutter means in any of a plurality of vertically spaced locations along said path, means for temporarily positioning said turntable and the rotatable chuck and key blank therein in said first position alongside said path means for rotating said cutter and means for moving said cutter vertically on said path.

2. The tubular key cutting machine set forthe in claim 1 and wherein spring means in said rotatable chuch normally urges said tubular key blank upwardly with respect thereto.

3. The tubular key cutting machine set forth in claim 1 and wherein a base rotatably supports said horizontal turntable, an inverted L-shaped frame on said base at one side of said turntable, said frame having vertical and horizontal sections, a portion of said horizontal section overlying said turntable and arranged for movement transversely of said frame, said key cutter means mounted on said transversely movable portion.

4. The tubular key cutting machine set forth in claim 1 and wherein a base rotatably supports said horizontal turntable and an upstanding frame on said base at one side of said turntable has a horizontal section partially overlying said turntable and a secondary horizontal section overlying said turntable and movably positioned on said horizontal section and wherein said key cutter means includes a vertically movable spindle rotatably mounted in said secondary horizontal section and spring means normally urging said spindle upwardly and means adapted to be actuated manually for moving said spindle downwardly.

5. The tubular key cutting machine set forth in claim 1 and wherein said first adjustment means includes a rotatable indicia carrying collar for indexing said first adjustment means relative to said path.

6. The tubular key cutting machine set forth in claim 1 and wherein said rotatable chuck is movably mounted in a bore in said turntable, clamping means in said turntable around said bore arranged when actuated to hold said rotatable chuck in fixed relation to said turntable.

7. The tubular key cutting machine set forth in claim 3 and wherein said horizontal section of said inverted L-shaped frame has shafts positioned transversely of an opening therein and said portion of said horizontal section carrying said key cutter means is partially positioned in said opening with said shafts slidably engaged in transverse bores in said portion.

8. The tubular key cutting machine set forth in claim 4 and wherein shafts are positioned transversely of an open area inwardly of the free end of said horizontal section of said upstanding frame and said secondary horizontal section has an end portion positioned in said open area with said shafts slidably engaging transverse bores in said secondary horizontal section.

9. The tubular key cutting machine set forth in claim 4 and wherein said first adjustment means includes a rotatable indicia carrying collar for indexing the locations of said secondary horizontal section relative to said path.

10. The tubular key cutting machine set forth in claim 4 and wherein said second adjustment means include replaceable rotatable cam members on said secondary horizontal section and an adjustment screw associated with said spindle for indexing the spindle's vertical locations along said path.

11. The tubular key cutting machine set forth in claim 4 and wherein a sleeve is mounted in a vertical bore in said secondary horizontal section of said upstanding frame, an area of larger diameter is formed on said spindle inwardly of its ends and located in said sleeve, bearing assemblies above and below said area of greater diameter of said spindle located within said sleeve and wherein said spring means normally urging said spindle upwardly is carried by said secondary horizontal section and engaged against said sleeve, said means adapted to be actuated manually for moving said spindle downwardly comprising a handle pivoted at one end to said secondary horizontal section and pivotally engaged inwardly of its ends on a housing having a bearing therein engaging said spindle adjacent its uppermost end.

* * * * *